United States Patent [19]

Lai

[11] Patent Number: 4,681,341
[45] Date of Patent: Jul. 21, 1987

[54] COLLAPSIBLE GOLF CART WITH ONE-STEP FOLDING OPERATION

[76] Inventor: Winston Lai, P.O. Box 10160, Taipei, Taiwan

[21] Appl. No.: 885,603

[22] Filed: Jul. 14, 1986

[51] Int. Cl.⁴ .............................................. B62B 1/26
[52] U.S. Cl. ................................. 280/646; 280/47.26; 280/DIG. 6
[58] Field of Search ................ 280/646, 42, 652, 655, 280/47.17, 47.33, DIG. 6; 248/96, 98

[56] References Cited

U.S. PATENT DOCUMENTS

| | | | |
|---|---|---|---|
| 2,619,360 | 11/1952 | Alter | 280/DIG. 6 X |
| 4,053,169 | 10/1977 | Taylor | 280/DIG. 6 X |
| 4,400,006 | 8/1983 | Larkin | 280/646 |
| 4,455,030 | 6/1984 | Rosen | 280/DIG. 6 X |

FOREIGN PATENT DOCUMENTS

| | | | |
|---|---|---|---|
| 249049 | 1/1964 | Australia | 280/DIG. 6 |
| 2028727 | 3/1980 | United Kingdom | 280/DIG. 6 |

Primary Examiner—John J. Love
Assistant Examiner—Michael Mar

[57] ABSTRACT

A collapsible golf cart includes: a supporting frame adapted for fastening a golf bag thereon and formed as a generally U-shaped frame, a pair of radial-movement legs pivotally mounted on two inclined-surface portions on the U-shaped frame, a wheel shaft having a pair of telescopic shafts respectively reciprocated on both sides of a sleeve to rotatably mount a pair of wheels, a pair of actuating links having their lower ends pivotally connected with the pair of legs and the pair of telescopic shafts, and a collapsible handle respectively pivotally connected with the supporting frame and the pair of actuating links, so that upon the raising of the handle, the pair of actuating links may simultaneously pull the two legs rearwardly and pull the two wheels transversely outwardly to quickly extend the folded cart with only a one-step operation.

5 Claims, 6 Drawing Figures

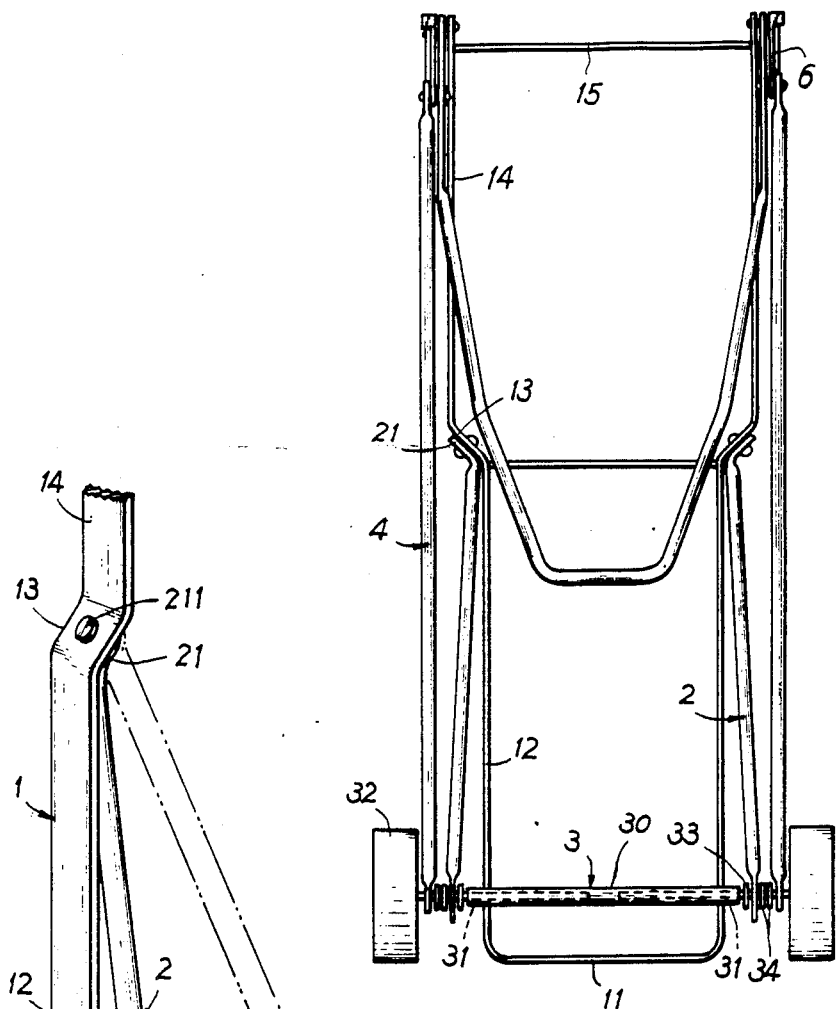
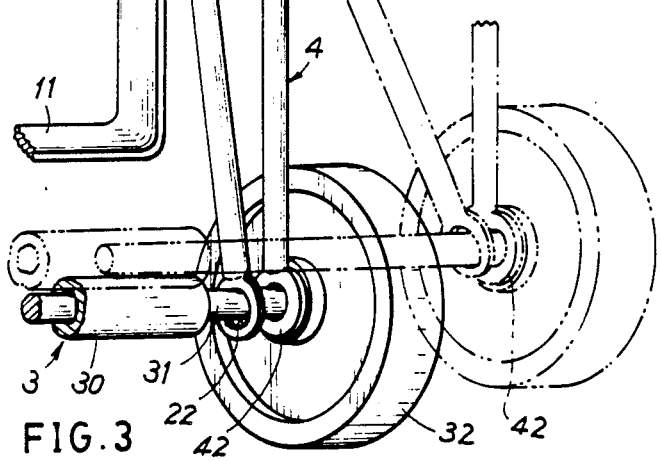
FIG. 4
FIG. 3

COLLAPSIBLE GOLF CART WITH ONE-STEP FOLDING OPERATION

BACKGROUND OF THE INVENTION

Since conventional golf bags are usually carried by a caddie, the cost of using them becomes too expensive to be popular. If the golf bag is loaded on a cart or buggy, such a cart would occupy a big space as to influence it handling. Recently developed golf carts have been been improved to be of the folding type to minimize its space. However, when extending such folded carts for golf playing, it still requires so many steps to extend the collapsible elements of the folded cart so as to cause inconvenience for the golf player. Meanwhile, most of the folding carts are made to have fixed wheels which are not folded but still occupy an appreciable volume during its handling. Since the fixed wheels have a wider span therebetween, the carts are more stable when moving on a golf course, but are inconvenient for handling due to their fixed large size.

The present inventor recognizes the defects of a conventional golf cart and has invented the present collapsible golf cart.

SUMMARY OF THE INVENTION

The object of the present invention is to provide a collapsible golf cart including a supporting frame adapted for fastening a golf bag thereon and formed as a generally U-shaped frame, a pair of radial-movement legs pivotally mounted on two inclined-surface portions on the U-shaped frame, a wheel shaft having a pair of telescopic shafts respectively reciprocated on both sides of a sleeve to rotatably mount a pair of wheels, a pair of actuating links having their lower ends pivotally connected with the pair of legs and the pair of telescopic shafts, and a collapsible handle respectively pivotally connected with the supporting frame and the pair of actuating links, so that upon the raising of the handle, the pair of actuating links may simultaneously pull the two legs rearwardly and pull the two wheels transversely outwardly to quickly extend the folded cart with only a one-step operation.

BRIEF DESCRIPTION OF THE DRAWINGS

FIG. 3 shows the operating principle of the radial-movement leg about the U-shaped frame in accordance with the present invention.

FIG. 4 is a back-view illustration showing the folded present invention.

DETAILED DESCRIPTION

Figure 1:
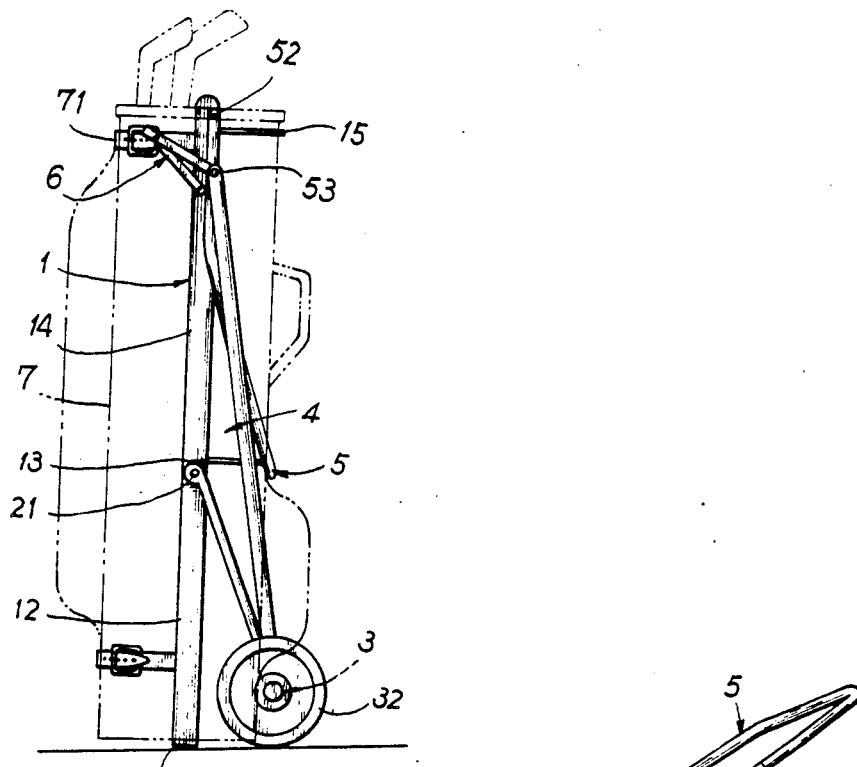
FIG. 1 is a side-view illustration of the present invention.
Figure 2:
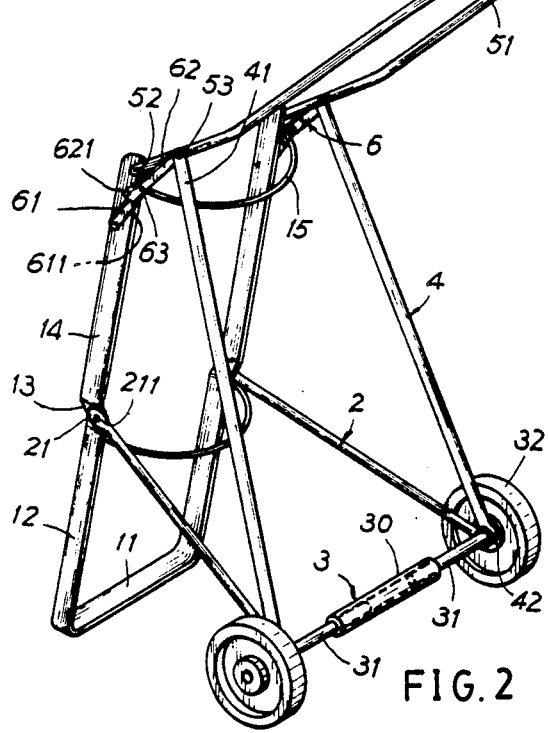
FIG. 2 is a perspective illustration when extending the present invention.
Figure 5:
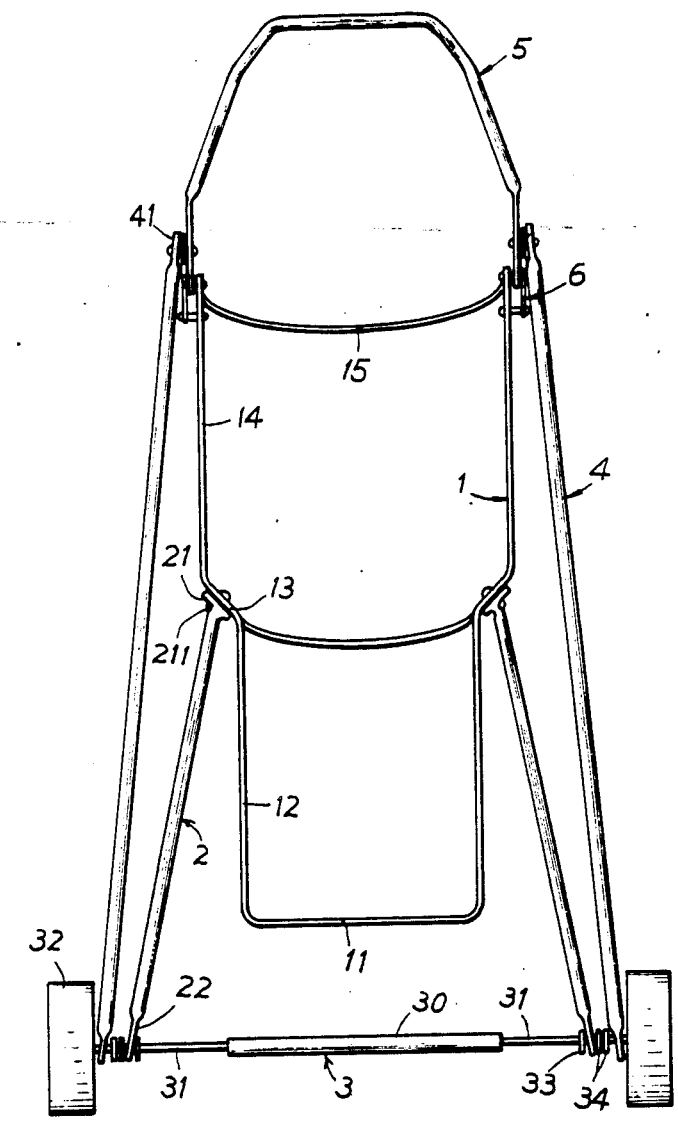
FIG. 5 shows an extended illustration as extending from FIG. 4.

As shown in FIGS. 1-5, the present invention comprises: a supporting frame 1, a pair of radial-movement legs 2, a wheel shaft 3 rotatably mounted with a pair of wheels 32 positioned behind the frame 1, a pair of actuating links 4, a collapsible handle 5 and a pair of locking link means 6.

The supporting frame 1 is formed as a generally U-shape frame and includes a base plate 11, two side arms 12 respectively protruding upwards from the both sides of the base plate 11, two inclined-surface portions 13 each extending upwards and outwards from each side arm 12, two upper arms 14 respectively extending from the two inclined-surface portions 13, and several brackets 15 formed on the arms 14, 12 adapted for fastening a golf bag 7 by belts 71.

The pair of radial-movement legs 2 are each formed with an inclined-surface plate 21 on the top end of each leg 2 to slidingly engage with the inclined-surface portion 13 of the frame 1 as pivoted by a screw 211 and formed with a hole 22 on the lower end of each leg 2 for pivotally connecting the leg 2 with the shaft 31, of which the diameter of the hole 22 should be slightly larger than that of a shaft 31 of the wheel shaft 3.

The wheel shaft 3 includes a central sleeve 30, a pair of telescopic shafts 31 respectively reciprocated in the two ends of the sleeve 30 and a pair of wheels 32 rotatably mounted on both outermost ends of the two shafts 31.

Each of the pair of actuating links 4 has its upper end pivotally connected with the handle 5 by a pin 53 and has its lower end formed with a hole 42 slightly larger than the diameter of the shaft 31 for pivotally connecting the actuating link 4 with the shaft 31. The lower end of each leg 2 is limited on the outer portion of a shaft 31 by a retainer washer 33. Several spacing washers 34 are disposed between the lower end of leg 2 and the lower end of link 4. The length of each shaft 31 should be long enough to provide smooth reciprocative operation of each shaft within the sleeve 30 without being released from the sleeve 30.

The collapsible handle 5 is also formed as a generally U-shaped handle having two open-ended arms 51, each open-ended arm 51 being pivotally connected to the upper end of each upper arm 14 of the frame 1 by a first pin 52. Adjacent the pin 52 on the open end of each arm 51, there is provided with a second pin 53 for pivotally connecting the upper end of the actuating link 4.

Each locking link means 6 includes a front link 61 pivotally secured to the upper portion of each arm 14 and formed with a recess portion 611 thereon, and a rear link 62 pivotally secured to the handle arm 51 by the second pin 53 and pivotally connected with the front link 61 by a pivot 63 and formed with a hook portion 621 operatively engaging with the recess portion 611 for locking the handle 5, the links 4 for extending the present invention when ready for playing use.

When extending the present invention for running use in a golf course from the folded condition as shown in FIGS. 1, 4 and the full line of FIG. 3, the handle 5 is pulled upwardly about the fulcrum at pin 52 to pull each actuating link 4, and to pull the lower end of each leg 2 so that the upper inclined surface plate 21 of each leg 2 is rotated about the axis of the screw 211 as the direction R shown in FIG. 3 to thereby extend the lower end of each leg 2 rearwards and transversely outwards so as to extend the two telescopic shafts 31 and the rotatably-mounted wheels 32 transversely outwards to a stable extended condition in commensuration with the front frame 1. Since the extending of the handle 5, the links 4, the legs 2 and the wheel-fixed shafts 31 is simultaneously operated in a one-step procedure, the present invention is novel and much improved over conventional folding golf carts. Alternatively, the extended elements of the present invention can also be folded simultaneously, just by lowering the handle 5 about the pin 52 and retracting the links 4, and the legs 2 to a position adjacent the frame 1 and retracting the shafts 31 into sleeve 30 to be a compact folding unit, convenient for handling and storage. Either inclined-surface portion 13 or plate 21 can also be made as an arcuated portion (not shown) concave upwards.

Figure 6:
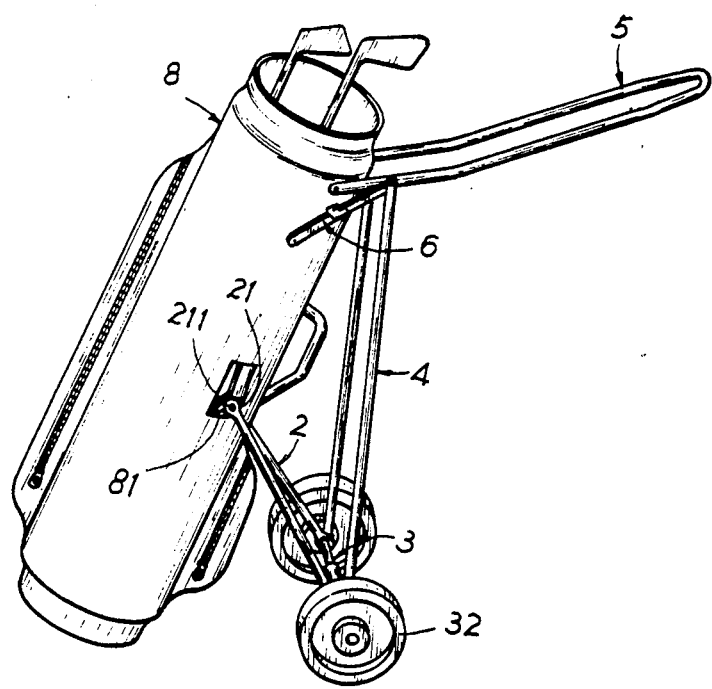
FIG. 6 is a perspective illustration of another preferred embodiment of the present invention.

Another preferred embodiment of the present invention is shown in FIG. 6 in which the aforementioned supporting frame 1 and the golf bag 7 are combined to be a rigid golf bag 8 having a pair of side extensions 81 each formed with inclined-surface portion thereon on both sides of the bag 8 for pivotally connecting the pair of legs 2 by two screws 211. The operating principle is the same as mentioned above.

Naturally, the folding mechanism of the present invention is not limited to be applied for golf carts. Other collapsible carts or buggies can be modified to incorporate the folding mechanism of the present invention and the modifications so made are still within the scope of this invention.

The lower end of each leg 2 may also be universally coupled with each telescopic shaft 31 by providing an universal joint 22a on the lower end of the leg 2.

I claim:

1. A collapsible golf cart comprising: a generally U-shaped supporting frame adapted for receiving and fastening a golf bag thereon, said frame having a base plate, two side arms extending upwardly from the sides of said base plate, an inclined-surface portion extending upwardly and outwardly from the upper end of each said side arm, and an upper arm extending upwardly from the upper end of each said inclined-surface portion;

a generally U-shaped handle having two arms with open ends, each open end being pivotally secured to a respective one of said upper arms by first pin means;

a pair of radial-movement legs, each leg having an upper end with an inclined-surface plate pivotally connected to a respective one of said inclined-surface portions by screw means for permitting sliding engagement of said inclinded-surface plate with said inclined-surface portion and a lower end with an opening extending therethrough;

a pair of actuating links, each link having an upper end pivotally connected by second pin means to a respective arm of said handle at a location adjacent said first pin means and a lower end with an opening extending therethrough;

a wheel supporting shaft including a central sleeve, a pair of telescopic shafts, and a wheel rotatably mounted on an outer portion of each shaft, the inner portion of each shaft, being telescopically received within a respective end of said central sleeve, each said shaft having its outer portion pivotally received within the opening at the lower end of each said radial-movement leg and said actuating link;

whereby when said cart is in a collapsed position, upon the raising of said handle about a fulcrum of said first pin means, said actuating links are pulled outwardly by said handle for moving the lower ends of said radial-movement legs rearwardly and outwardly while their upper ends pivot about the axis of said screw means, thereby resulting in the extension of each wheel and its respective telescopic shaft in an outwardly transverse direction for increasing the stability of the cart.

2. A collapsible golf cart according to claim 1, wherein said supporting frame and said golf bag are combined as a rigid bag having the two side arms disposed on both sides of said bag, with the inclined-surface portion being formed on each side arm for sliding engagement with said inclined-surface plate of each said radial-movement leg.

3. A collapsible golf cart according to claim 1, wherein said handle is secured to said frame by a pair of locking link means which includes a front link pivotally secured to each upper arm of said frame and formed with a recess portion thereon and a rear link pivotally connected with said front link and pivotally secured to said handle by said second pin means and formed with a hook portion operatively engaging with said recess portion of said front link to lock said handle, said links and said legs at a stable extending condition.

4. A collapsible golf cart according to claim 1, wherein said inclined-surface portion of said frame or said inclined-surface plate of said leg are each concaved upwardly and formed as an arcuated portion which are slidingly engageable with each other.

5. A collapsible cart according to claim 1, wherein the lower end of each said leg is universally coupled with each said telescopic shaft by said pivotal connection therebetween.

* * * * *